FUEL ARRANGEMENT FOR A NUCLEAR REACTOR

Original Filed Nov. 26, 1963 6 Sheets-Sheet 1

FUEL ARRANGEMENT FOR A NUCLEAR REACTOR

Original Filed Nov. 26, 1963 6 Sheets-Sheet 2

FUEL ARRANGEMENT FOR A NUCLEAR REACTOR

Original Filed Nov. 26, 1963 6 Sheets-Sheet 3

FUEL ARRANGEMENT FOR A NUCLEAR REACTOR

Original Filed Nov. 26, 1963 6 Sheets-Sheet

FUEL ARRANGEMENT FOR A NUCLEAR REACTOR

Original Filed Nov. 26, 1963 6 Sheets-Sheet 5

FUEL ARRANGEMENT FOR A NUCLEAR REACTOR

Original Filed Nov. 26, 1963 6 Sheets-Sheet 6

United States Patent Office

Re. 27,950
Reissued Mar. 26, 1974

27,950
FUEL ARRANGEMENT FOR A NUCLEAR REACTOR

Erling Frisch, Pittsburgh, Pa., assignor to Westinghouse Electric Corporation, Pittsburgh, Pa.

Original No. 3,379,618, dated Apr. 23, 1968, Ser. No. 513,655, Dec. 3, 1965, which is a continuation of application Ser. No. 326,070, Nov. 26, 1963, which is a continuation-in-part of application Ser. No. 19,851, Apr. 4, 1960, both now abandoned. Application for reissue June 15, 1971, Ser. No. 153,204
Int. Cl. G21c *3/34*
U.S. Cl. 176—78 44 Claims

Matter enclosed in heavy brackets [ ] appears in the original patent but forms no part of this reissue specification; matter printed in italics indicates the additions made by reissue.

ABSTRACT OF THE DISCLOSURE

*A fuel assembly support structure for permitting individual longitudinal expansion of a bundle of long fuel elements, yet maintaining accurate lateral spacing. The support structure includes one or more grids forming openings through which the fuel elements extend and has springs extending into the openings to engage the fuel elements to position them laterally, yet permit each fuel element to expand lengthwise. The support structure includes a long structural device to which the grid is secured for stabilizing the position of the grid relative to the movable fuel elements. A novel end plate configuration for a fuel assembly is also included.*

This application is a continuation of copending application Ser. No. 326,070, entitled, "Fuel Arrangement for a Nuclear Reactor," filed Nov. 26, 1963, by Erling Frisch and now abandoned, and assigned to the present assignee. The aforementioned application Ser. No. 326,070 is in turn a continuation-in-part of copending application Ser. No. 19,851, entitled, "Fuel Arrangement for a Nuclear Reactor," now abandoned, filed Apr. 4, 1960, by Erling Frisch, and also assigned to the present assignee.

The present invention relates to nuclear reactors and more particularly to means for supporting elements bearing fissionable material or fuel in heterogeneous pressurized reactors of the neutronic type.

A fissionable neuclear reaction, which makes available considerable energy, can result when a fissionable atom captures a neutron having an energy level within a range of energy levels characteristically necessary for enabling fission to occur in the atom. With a suitable disposition of material containing fissionable atoms, a nuclear chain reaction can be sustained, such that, with the introduction of limitative or control means, successive generations of fissions substantially equal each other in number, even though each fission results in the release of two or three or more neutrons. The neutrons which are not employed for propagating the chain reaction are accounted for as either escaping the reactive region in which the fissionable material is dispersed or as being absorbed by fertile, control, or structural materials within the reactor. Of course, if desired, the escaping neutrons can be minimized in number by surrounding the reactive region with a material which characteristically is of high neutron reflective quality.

The chain nuclear reaction can be used for a variety of purposes, such as power generation or irradiation of test specimens. With reference to the former example, the chain reaction provides energy to be harnessed for beneficial use in other forms. For instance, the heterogeneous pressurized reactor has evolved as one type of arrangement for enabling the chain energy to be harnessed for beneficial use.

In the more specific case of the heterogeneous pressurized water reactor, a coolant in the form of water is circulated through the reactive region for the purpose of removing the produced energy in the form of heat for transfer through a heat exchanger or steam generator elsewhere in the circulatory system to operate a prime moving device, such as a turbine, and ultimately an electrical generator having an output of usable electrical energy.

The reactive region conventionally includes an arrangement of fuel elements, such as an array of encased fuel, formed from uranium dioxide or other fissile material. Once a nuclear reaction is initiated, its propagation as a chain reaction can be enhanced by using a suitable coolant such as water or certain organic materials which additionally serve to moderate or slow-down emitted neutrons to fission-producing energy levels. The rate at which fissions occur can be directly controlled by the use of control rods or other members comprised of a neutron-absorbing material, such as hafnium, and usually variably insertable within the reactive region or among the fuel elements.

The number of fuel elements which are used to form the reactive region is ordinarily determined by the critically necessary mass of the fissile material and by other considerations, such as the desired energy output and the allowable thermal character of the region. Conventionally, the fuel elements are formed into bundles or subassemblies, with the subassemblies being assembled or combined to form an overall assembly or the reactive region.

In the exemplified pressurized water reactor or, in fact, in most if not all neutronic reactors having substantially uniformly enriched cores, the neutron flux density varies within the reactive region as a function of the coordinate position relative to the core structure. This is clearly so, for example, in that certain coordinate positions, such as those located centrally of the reactive or core region, are in greater proximity to a greater number of fissions and, therefore, have a statistically greater probability of being in the path of fission-producing neutrons. In locations in which elevated neutron flux is determined to exist, it can also reliably be correlated that the local heat generation of the adjacent fuel elements, in the case of the heterogeneous-type reactor, is relatively elevated because an elevated number of fissions and released energy is associated with the elevated neutron flux. Thus, with continued reference to the exemplified pressurized water reactor, spaced fuel elements located within the same bundle or subassembly can experience different rates of heat generation and resulting differing rises in temperature. Moreover, such factors as flux peaking in adjacent water channels, unequal distribution of coolant flow through the core region, presence of adjacent structural material, xenon-tilt and other flux perturbations, also lead to the same effect. Accordingly, the spaced fuel elements respond with correspondingly different thermal expansions or contractions so that, unless means are provided for offsetting this thermal effect, the bundle can be subjected to deformation or bowing which, in general, is undesirable since "hot spots" or regions of extreme temperature rise in the fuel elements can then result. An additional undesirable effect arises when peripherally located fuel elements bow to join or obstruct control rod movement.

Conventional or rigid arrangements of fuel elements, regardless of the type of reactor in which they are employed, do not have the capacity to resolve properly the bowing problem, as exemplified here by reference to the pressurized water reactor. In certain applications, such as those in which the fuel elements are accorded a relatively small size, the bowing effect may, in fact, be neglectable depending upon design specifications, however, the fact remains that the bowing effect is objectionable in a considerable number of instances, particularly in those instances in which the size of the fuel elements is accorded a magnitude resulting in a relatively significant amount of bowing or other deformation. It is in the perspective of the remarks thus far made that the present invention will be better understood.

Thus, it is an object of the invention to provide novel means for supporting fuel elements in a nuclear reactor.

It is another object of the invention to provide a novel arrangement of fuel elements, for a neutronic reactor, including means for enabling contraction or expansion of the fuel elements to occur without resulting in any significant deformation or bowing of the arrangement as a whole.

A further object of the invention is to provide a novel fuel element arrangement having relatively rigid means for supporting the fuel elements and for enabling the fuel elements to contract and expand without bowing the elements or deforming the rigid means.

Still another object of the invention is to provide a novel fuel element arrangement including a relatively rigid structure having means for supporting the fuel elements and for enabling the fuel elements to contract and expand without significantly bowing the elements or deforming the arrangement as a whole.

Still a further object of the invention is to provide a novel fuel element arrangement in which the rigid means includes a grid-like member for laterally stabilizing the fuel elements yet, if desired, for enabling movement of the same relative to the grid member at least within prescribed limits.

It is another object of the invention to provide a novel fuel element arrangement characterized such that the fuel elements can be readily inserted or removed from the arrangement.

In addition, an object of the invention is to provide a novel fuel element arrangement in which the fuel elements can be included without serving as structural members for the arrangement thereby to enable the thickness of the cladding portion of the elements to be reduced.

Another object of the invention is to provide a novel fuel element arrangement for which intricate brazing or wlding techniques are not required and for which fabrication, assembly, and inspection are considerably facilitated.

More specifically, an object of the invention is to provide a novel fuel element arrangement for which a relative minimum of separate fasteners is required and in which means are provided for preventing disengagement and loss of any fuel element.

It is an additional object of the invention to provide a novel fuel element arrangement which, when placed in use, precludes a jamming or bearing contact of adjacent control rods against the cladding portion of peripheral fuel elements.

These and other objects of the invention will become more apparent upon consideration of the following detailed description of several illustrative embodiments thereof as related to the attached drawings, in which.

Figure 13:
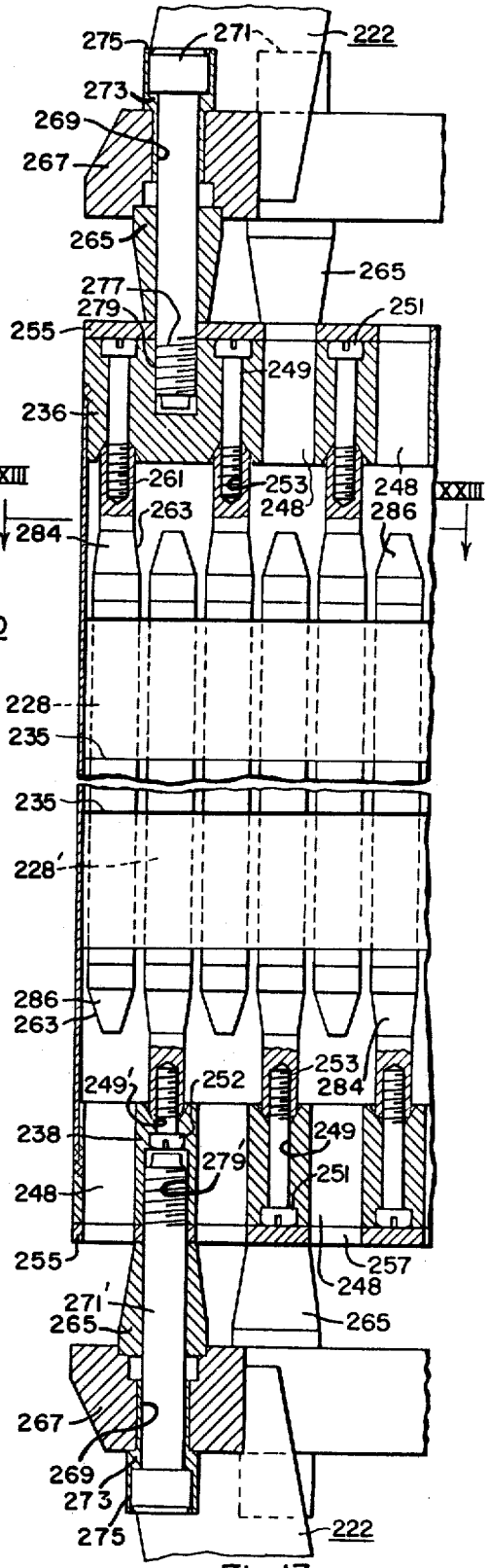
FIG. 13 is a longitudinally sectional view taken along the reference line XIII—XIII of FIG. 14 with portions being in section and other portions being removed for clarity.
Figure 22:
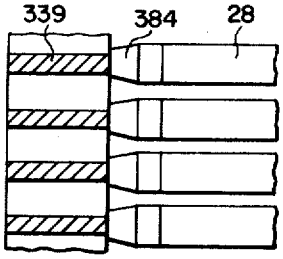
Figure 21:
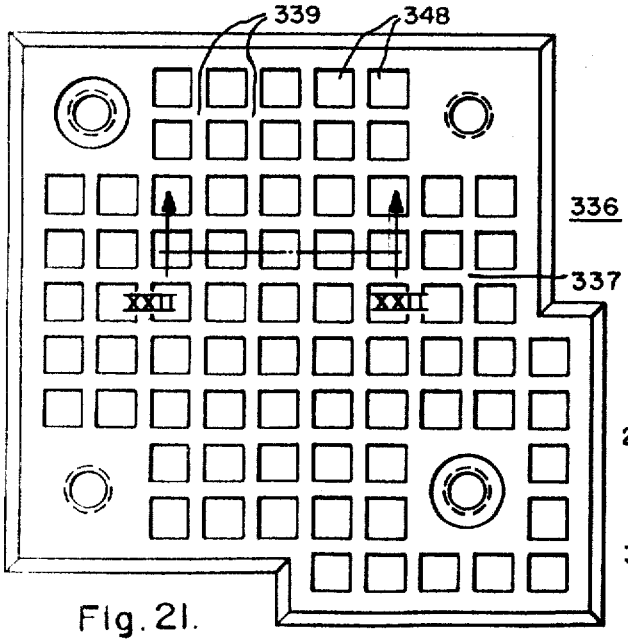
FIG. 21 is a plan view of an alternative end plate that can be employed with the fuel arrangement of FIG. 1 or that of FIG. 12.
Figure 23:
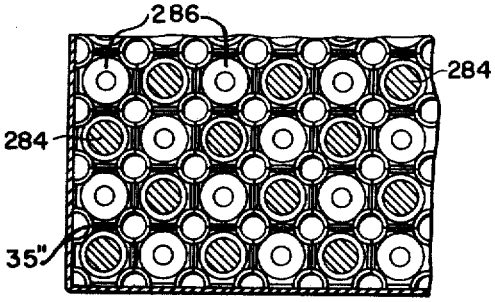

FIG. 22 is a cross sectional view which is taken along the reference line XXII—XXII of FIG. 21 to show the relation of the end plate to adjacent fuel elements when employed as just related; and FIG. 23 is a partial cross-sectional view taken along the reference line XXIII—XXIII of FIG. 13 to show a portion of a grid member included therewith and to show the distribution of the connected and free ends of the fuel elements at either end of the fuel assembly.

With regard to the broad precepts of the invention, means are provided for supporting elongated fuel bearing elements for the purpose of forming a fuel element arrangement for a nuclear or neutronic reactor, such that at least some of the elements can be free to contract or expand at least differentially in the longitudinal direction as necessitated, for example, by thermal forces. The supporting means include a relatively rigid frame member within which the elements are positioned, and, if desired, can be adapted to enable the fuel elements to be inserted into, or removed from, the arrangement individually. In addition, means are provided for laterally stabilizing the fuel elements through the use, for example, of a structural or grid member located between the opposing ends of the fuel elements. The grid member imposes restrictive forces on lateral movement of the fuel elements and, if desired, can be adapted to enable longitudinal or axial movement of the fuel elements relative thereto, with the axial movement of the fuel elements being limitable by other portions of the supporting means. To illustrate more clearly but not to limit these broad principles of the invention, the detailed description will now be set forth.

Figure 1:
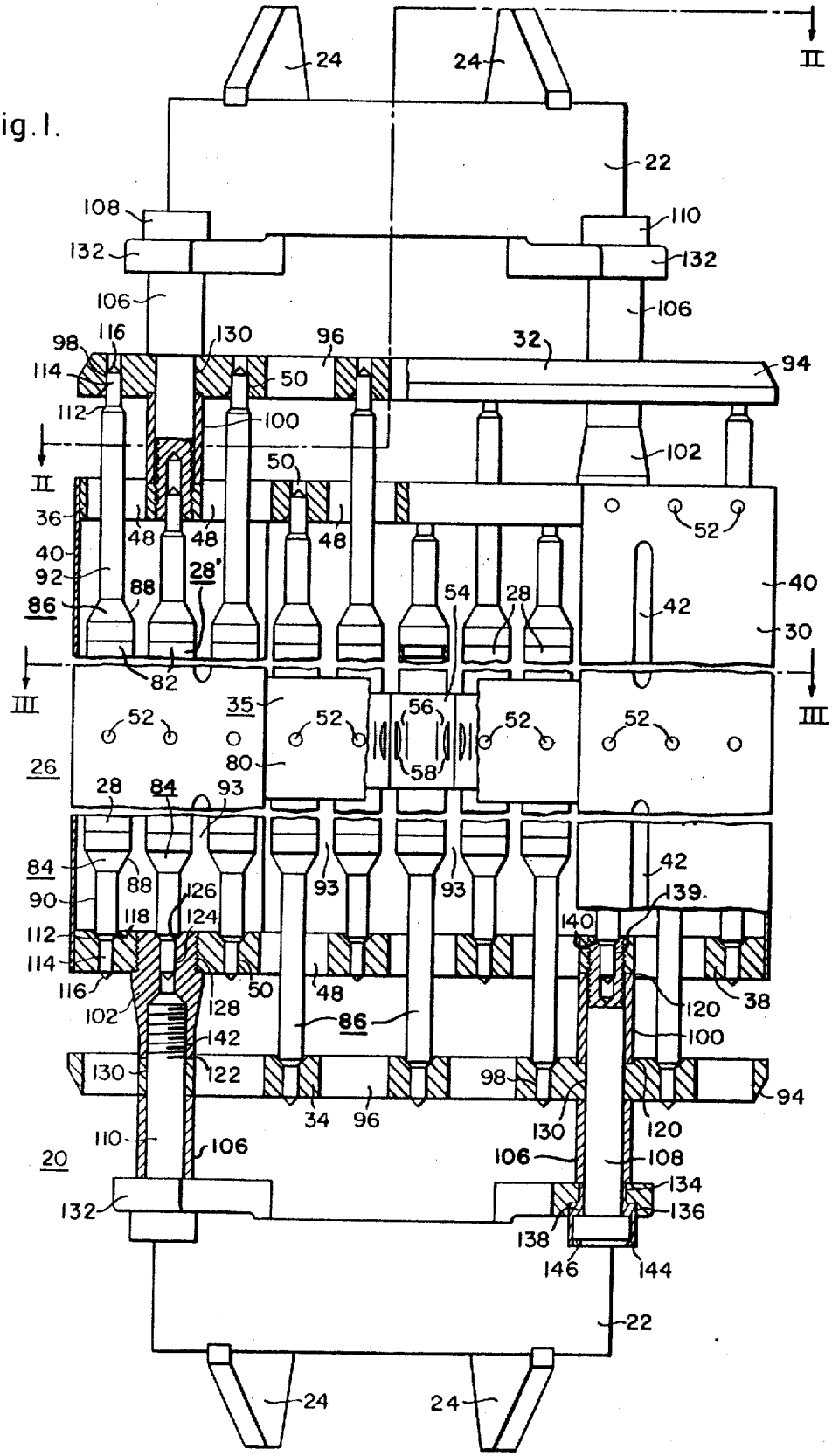
FIGURE 1 is a front elevational view, being partially in section and having certain portions removed for clarity, of a fuel element arrangement constructed in accordance with the principles of the invention for a neutronic reactor.

With reference to FIG. 1, a fuel element arrangement or subassembly 20 is provided for suspension between upper and lower core supporting plates (not shown) which are ordinarily provided in heterogeneous nuclear or neutronic reactors for the purpose of supporting a plurality of fuel element subassemblies in forming the aforementioned reactive region or core. The referenced core supporting plates ordinarily are in turn supported by other conventional structural members of the reactor including, for example, a cylindrical supporting barrel (not shown).

The fuel element arrangement 20 includes oppositely positioned end nozzles or mounting members 22 for engagement with the aforementioned core supporting plates through flow holes provided therein. In addition, the end nozzles 22 are provided with outwardly projecting lugs 24 for the purpose of enabling the fuel arrangement 20 to be handled through the use of tools. Between the end nozzles 22, means 26 are provided for supporting a plurality of fuel elements or rods 28 in the form of an array or a lattice.

In the embodiment of the invention shown in FIG. 1, the supporting means 26 include a frame member 30 and upper and lower end plates or retaining plates 32 and 34 for aiding in retaining the fuel elements 28 substantially within the frame member 30. In addition, the supporting means 26 include means for laterally supporting the fuel elements 28 at points within the frame member 30, preferably comprising a grid-like member, or, as to be denoted here, a grid 35 integrally formed with the frame 30. A number of species of the grid 35 are shown in the various figures, and for a full description of the species shown in FIGS. 3 through 11 and 17 through 20, reference is made to a copending application of E. Frisch, A. G. Thorp and T. F. Widmer, Ser. No. 19,760, entitled "Means for Supporting Fuel Elements in a Nuclear Reactor," filed on Apr. 4, 1960, now U.S. Patent 3,182,003, issued May 4, 1965, and assigned to the present assignee.

Figure 2:
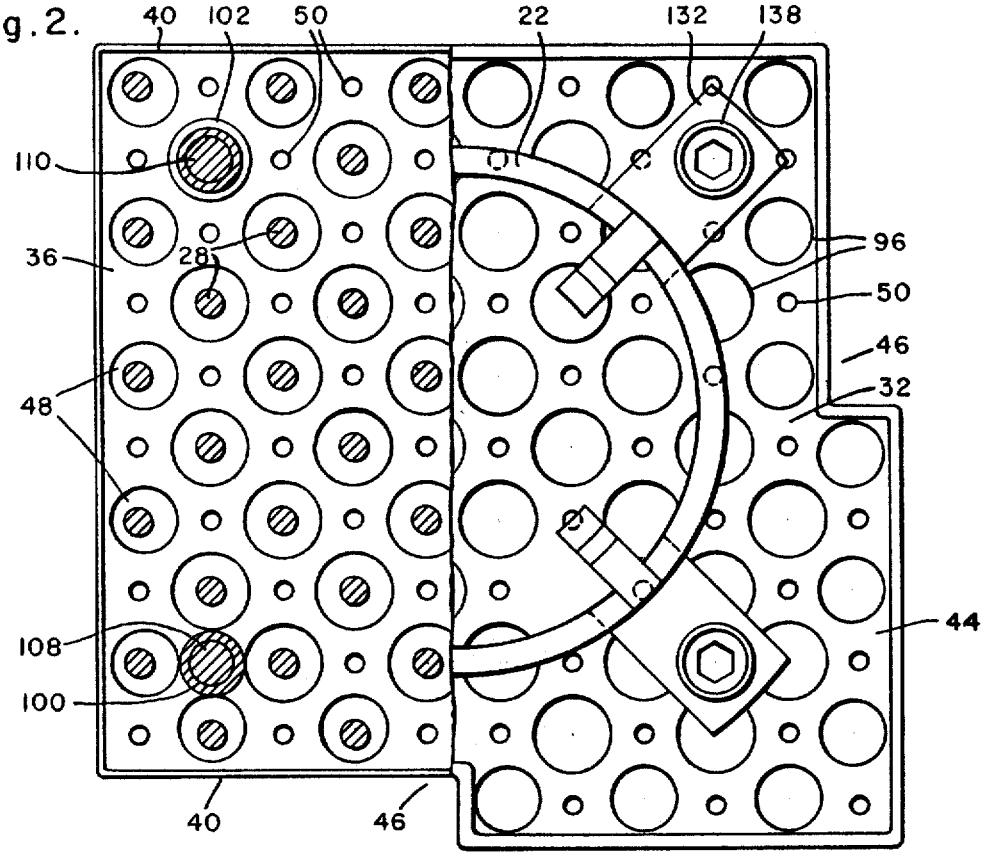
FIG. 2 is a top plan view of the fuel element arrangement illustrated in FIG. 1, with portions of the arrangement also being removed here for clarity.

The frame 30, being in this embodiment of the invention the basic structural framework of the fuel arrangement 20, comprises upper and lower additional end plates 36 and 38 which provide for a transfer of cooling fluid along the fuel elements 28 and which, if desired, can also be used to position accurately the fuel elements 28 substantially within the frame 30. The frame 30 also comprises upstanding structural members or struts 40 which support the end plates 36 and 38 in spaced relation. As viewed in FIG. 2, the struts 40 are formed here as angled brackets so as to support the end plates 36 and 38 at their corners. The structs 40 are formed from thin sheet material; and if desired, ribs 42 (FIGS. 3 and 9) can be provided, in the upstanding direction for example, on the struts 40 to provide whatever rigidity is required for the same.

The material from which the frame 30 and other structural elements of the arrangement 20 can be formed is for obvious reasons, desirably to be characterized with effective resistance to corrosion, suitable structural qualities, and a low neutron absorption cross section. As such, Zircaloy, an alloy of zirconium which is highly effective in transmitting rather than absorbing neutrons, can be employed; but, for economy purposes, it may be desirable that stainless steel, being of somewhat poorer neutron transmittal quality, be employed if the fuel inventory is suitably adjusted or if the quantity of material that is used is relatively minimized in amount so as to provide intended structural functions yet so as to provide an acceptably low overall amount of neutron absorption. For the reasons just considered and for economy purposes, it is desirable to form the struts 40 to be relatively thin, with the ribs 42, if necessary, when a material such as stainless steel is used. In any event, of course, the struts 40 must be formed so as to resist without significant deformation any compressive or buckling or bending stresses incurred during use.

The criteria for selecting the material for the end plates 36 and 38 will, of course, include the considerations just set forth. Generally, as viewed in FIG. 2, the end plates 36 and 38 are square in form with an offset portion 44 and with the resulting recesses 46 being employed as passages for control rods (not shown) when the arrangement 20 is positioned in the aforementioned core.

To provide the required amount of coolant flow determined through fluid transfer and thermodynamic considerations, a plurality of flow passages 48 are provided through the plates 36 and 38. In this application of the invention, the flow passages 48 are generally symmetrically located over the entire face of the end plates 36 and 38 in order to provide as much uniformity as possible in the coolant flow. The cross-sectional area of the passages 48 is, of course, also determined in conjunction with other parameters such as the overall rigidity which is required for the end plates 36 and 38.

In addition, means can, if desired, be provided for engaging the adjacent ends of the fuel elements 28; and, if further desired, this means can be adapted for slidably engaging the adjacent ends of all or selected ones of the fuel elements 28. In this instance, the engaging means are provided in the form of recesses or channels 50 in the plates 36 and 38 for the purpose of receiving in guiding or sliding relation end portions of the fuel elements 28. Since the recesses or channels 50 also have a bearing upon the overall rigidity of the end plates 36 and 38, it follows that they also are necessarily taken into consideration in determining the required geometry of the plates 36 and 38. As will be described hereinafter and as already implied, the frame end plates can be provided with a form which does not include means for lateral holding of the fuel element ends.

Included with the frame 30, as viewed in FIG. 1, for attachment to the struts 40, is the grid 35 located substantially centrally of the struts 40, or a plurality of grids 35 spaced uniformly, if desired, along the upstanding direction of the struts 40, with the number of grids 35 being that which is determined to be necessary for laterally supporting the fuel elements 28. The grid or grids 35 are generally shaped to conform with the shape of the end plates 36 and 38 so as to be positionable in a lateral plane within the frame 30 for securance to the struts 40. It is to be noted that the embodiment of the invention shown in FIG. 1 includes the grid species shown in FIG. 3, but other grid species can just as well be employed.

In order to secure together the struts 40 and the grid or grids 35 and the end plates 36 and 38, any one of several means can be employed. For example spot Heliarc welds can be employed, as indicated by the reference character 52. By this method, the adjoining surfaces to be integrated are brought into firm contact and an electric arc in a helium atmosphere is struck with the use of a special electrode holder. The arc causes confined melting of the metal of the adjoining surfaces at the point of contact with an excellent bond resulting after cooling. With accurate control of arc current and time of arc duration, sheet material can be welded satisfactorily within a relatively wide thickness range of the material. Perhaps more importantly, the resulting bond can be obtained with a minimum warping or bowing of the frame 30 relative to the amount of warping which might otherwise be occasioned. Of course, other methods of joining, such as spot welding, plug welding or brazing may be employed. To provide a shield against control rod interference, guard members 80, as observed in FIGS. 1 and 3, can be bonded, as by Heil-arc spot welding as indicated by the reference character 52, to the outer edges of the grid 35 between the struts 40 in the embodiment of the invention shown in FIG. 1.

Whichever bonding or other securing method is employed, the net effect is that the strut [30] *40* can be provided with rigidity and with required straightness and squareness through the use of available machine tools and fixtures. It is to be noted that since the variation of neutron flux across the aforementioned core has negligible effect upon the temperature of the struts 40, which of themselves are not a heat source as are the fuel elements 28, the frame [20] *32* has little or no tendency to warp or bow when placed in use.

Figure 3:
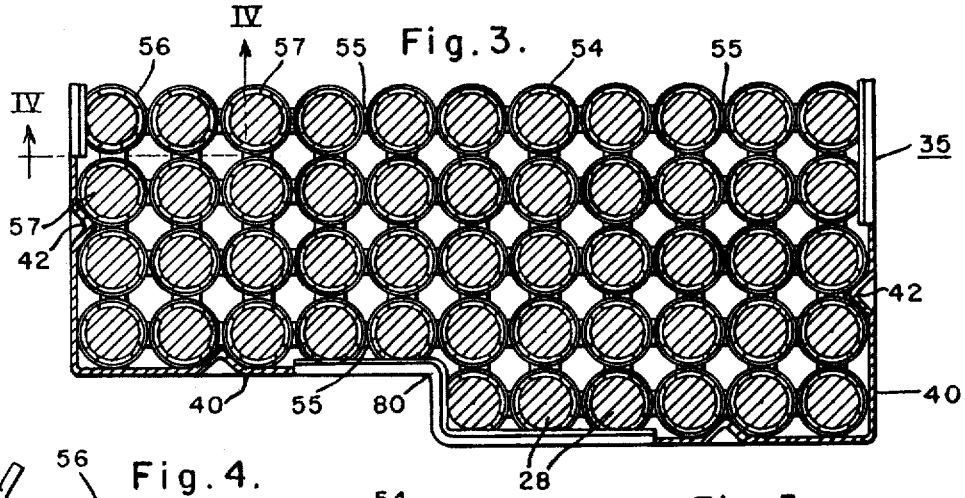
FIG. 3 is a partial sectional view taken along the reference line III—III of FIG. 1 to show a portion of a grid member included therewith.
Figure 4:
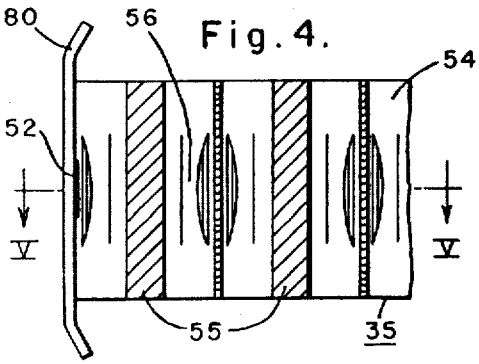
FIG. 4 is an enlarged, partial sectional view taken along the reference line IV—IV of FIG. 3 to show in elevation a portion of the grid member illustrated in FIG. 3.
Figure 5:
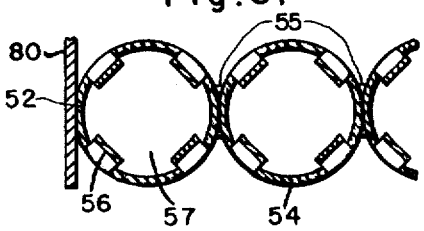
FIG. 5 is a sectional view taken along the reference line V—V of FIG. 4 to show in cross-section a portion of the grid member shown in FIG. 3.

The species of the grid 35 which is shown partially in FIG. 3 can be formed, with the aid of backing or supporting members (not shown) or ceramic or other heat resistant material, by welding or brazing together, as indicated by the reference character 55, relatively thin-walled tubular elements or ferrules 54 into rigid relation. The ferrules 54 are sized in cross-section to provide openings 57 for the respective fuel elements 28. The fuel elements 28, which will subsequently be described more fully, are generally circular in cross-section to conform generally with the cross-section of the ferrule openings 57. Clearly, if fuel elements having different cross-sectional forms are selected for use, corresponding cross-sectional forms can be provided for the grid elements, or ferrules 54.

To provide securing or resilient forces for laterally supporting and stabilizing the fuel elements 28, portions of the grid elements of ferrules 54 can be employed. As clearly observed in FIGS. 1, 3 and 4, spring-like portions or strips 56 can be deflected inwardly of the ferrules 54 for engagement with the fuel elements 28, thereby providing in this embodiment of the invention a resilient character for the resulting forces which stabilize the fuel elements 28. In this example, longtudinal slits 58 are provided on each side of the strips 56.

Although a resilient engagement of the grid 35 with the fuel elements 28 is to be preferred in many applications, the grid 35 or other lateral supporting means can be secured, as previously implied, to the fuel elements 28 for engaging purposes. For a fuller description of the species of the grid 35 just considered, reference can be made to the aforementioned copending application.

Figure 6:
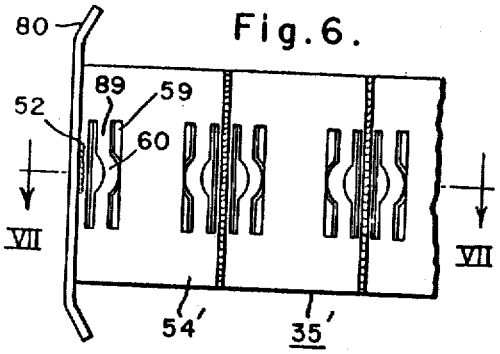
FIG. 6 is a view similar to FIG. 4 and is illustrated here to show an alternate construction for the grid member.
Figure 7:
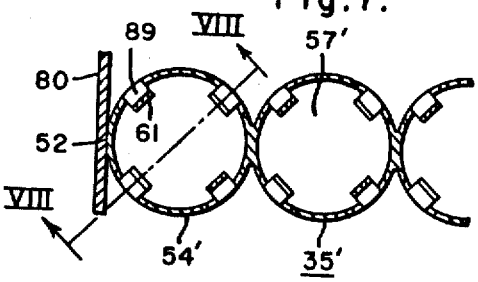
FIG. 7 is a sectional view of the alternate construction shown in FIG. 6 taken along the reference line VIII—VIII thereof.
Figure 8:
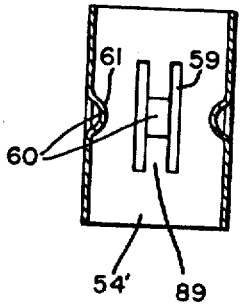
FIG. 8 is a sectional view taken along the reference line VIII—VIII of FIG. 7 to show a differing cross-section of the alternate grid-member of FIG. 6.

Alternately, as viewed in FIGS. 6, 7 and 8, the necessary forces for resiliently engaging the fuel elements 28 inserted through grid 35' can be obtained with the use of portions 89 of ferrules 54' having inwardly extending projections 60 and being adjoined by slots 59 extending in the upstanding direction. With this alternate arrangement, the fuel element engaging forces, in effect, are concentrated to be imposed by an innermost and limited surface area 61 of the strip projections 60, when the fuel element is inserted through opening 57' of the associated ferrule.

Figure 9:
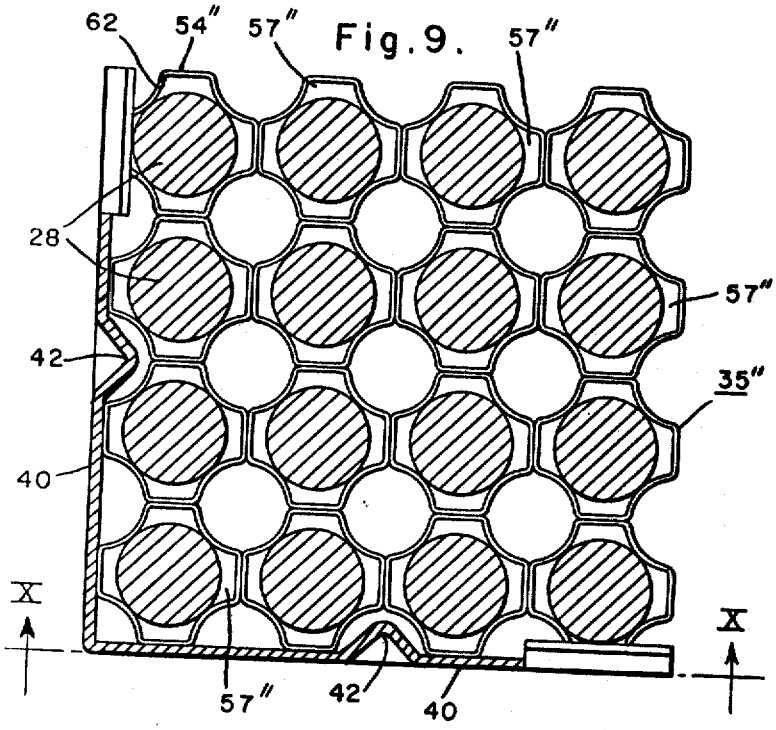
FIG. 9 is an enlarged cross-ectional view similar to FIG. 3 and is shown here to illustrate another alternate construction for the grid member.
Figure 10:
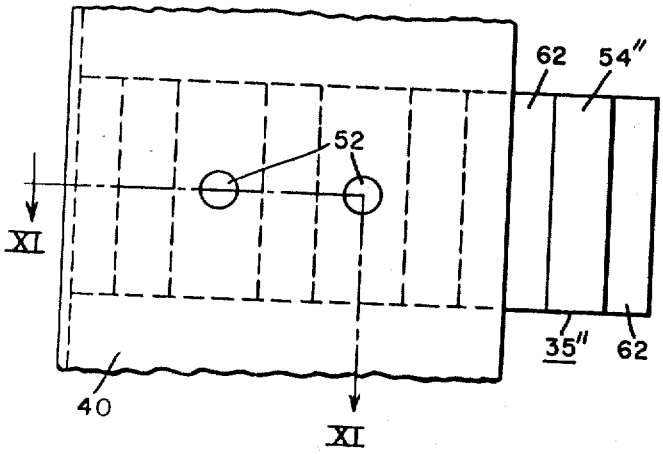
FIG. 10 is a partial view, taken along the reference line X—X of FIG. 9, of a fuel element arrangement similar to that of FIG. 1.
Figure 11:
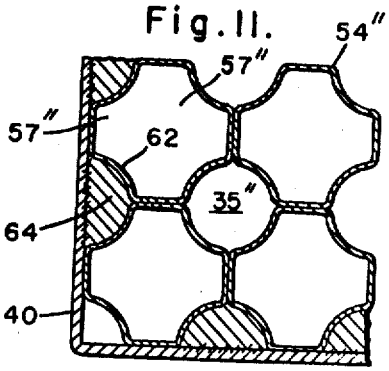
FIG. 11 is a sectional view taken along the reference line XI—XI of FIG. 10 to show an alternate means for securing the grid member of FIG. 9 to upstanding support members of a fuel element arrangement similar to that of FIG. 1.

As another alternate lateral supporting arrangement, the grid 35'' can be formed of ferrules 54'' with wall portions 62 thereof being deflected inwardly to provide the preferred resilient forces for engaging the fuel elements 28 inserted through openings 57''. This arrangement is shown in FIGS. 9, 10 and 11. If desired, as viewed in FIG. 11, filler material, as indicated by the reference character 64, can be brazed or otherwise bonded between the ferrule portions 62 which are adjacent thereto in order to provide base material on the grid 35'' for bonding of the same to the struts 40.

Another form that can be provided to obtain lateral support is depicted in FIGS. 17 through 20. Generally, this is another species of the grid, here identified by the reference character 81, and is similar to the grid species 35' and 35'' respectively considered in connection with FIGS. 6 through 11. Here, however, slots 63 are formed in ferrules 83 adjacently to the furrule portions 85 so that tabs 65 are formed to provide the preferred resilient engaging forces for the fuel elements 28. A more thorough description of the grid species shown in FIGS. 6 through 11 and in FIGS. 17 through 20 can, as in the case of FIG. 3, be obtained by reference to the aforementioned copending application.

Figure 16:
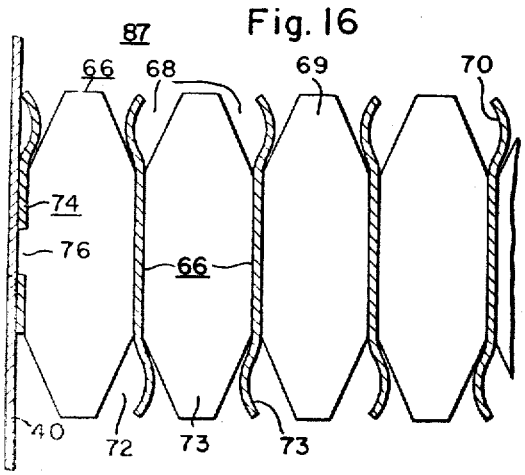
FIG. 16 is a longitudinally sectional view similar to FIG. 4 taken along the reference line XVI—XVI of FIG. 15.
Figure 15:
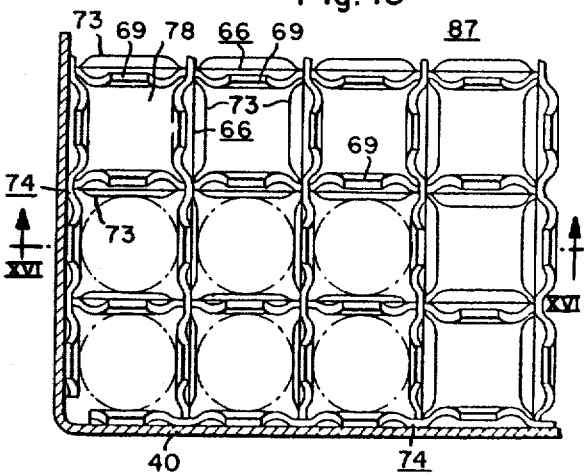
FIG. 15 is an enlarged plan view partially sectioned and similar to FIG. 9 of still another form for the grid member.
Figure 17:
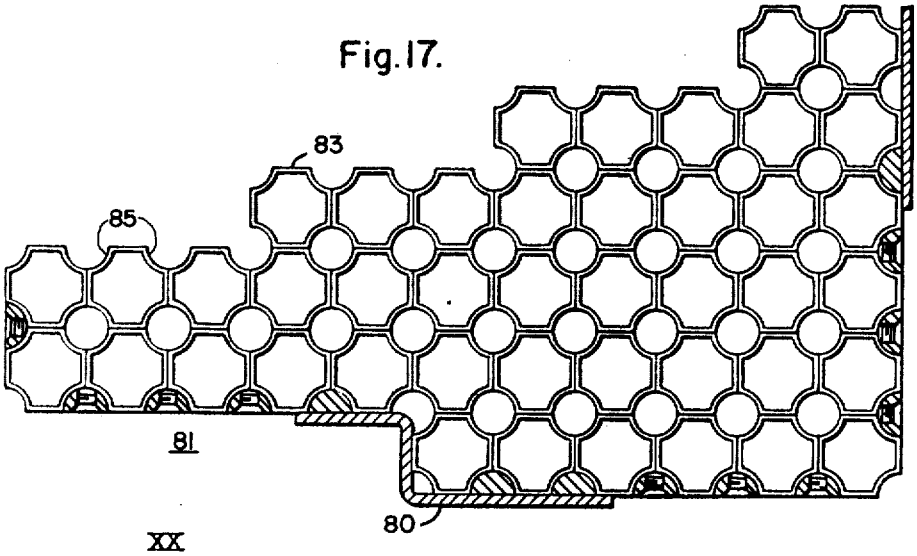
FIG. 17 is a plan view partially sectioned and similar to FIG. 9 of still another form for the grid member.
Figure 18:
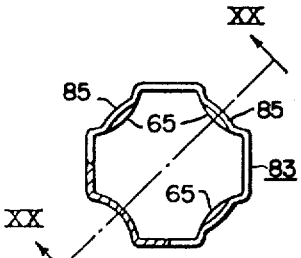
FIG. 18 is an enlarged top plan view, with portions removed, of one of the elements of the grid of FIG. 17.
Figure 19:
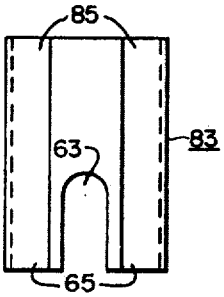
FIG. 19 is a front elevational view of the element shown in FGI. 18.
Figure 20:
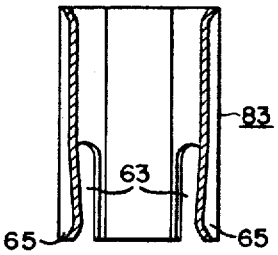
FIG. 20 is a sectional view of the element shown in FIG. 18 and taken along the reference line XX—XX thereof.

Still another alternate form for the grid 35 is depicted in FIGS. 15 and 16. In this form a plurality of relatively thin inner straps 66 and outer straps 74, of stainless steel for example, are interwoven to provide a structural network, similar to an "egg-crate," for the grid modification 87. To enable the straps 66 to be assembled as described, notches 68 are provided therein so that all the straps 66 extending in one direction can be engaged by all of the straps 66 extending in the direction transverse to the one direction.

The resulting tabs 69 located between the notches 68 can be deformed, as indicated by the reference character 70, to provide spring elements for the purpose of resiliently engaging the fuel elements 28. In addition, notches 72 can be provided in each of the straps 66 oppositely of the notches 68 for the purpose of providing resilient tabs 73 which are identical with, but oppositely disposed of, the resilient tabs 69.

To rigidize the grid 87, the inner sections of the straps 66 can be bonded together by furnace brazing or by other means. Lugs 76 on the straps 66 can be projected into openings (not shown) in outer straps 74 for indexing purposes, and the outer straps 74 can be secured to the adjacent straps 66, as by fusion welding. The outer straps 74 can then, of course, be bonded to the frame struts 40 in the manner previously described in connection with FIG. 1. With this arrangement, then, an opening 78 is provided for each of the fuel elements 28 with opposing tabs 69 and opposing tabs 73 providing resilient forces for engaging the fuel elements 28.

It is to be noted that each of the aforementioned grid structures 35, 35', 35'', 81, or 87 provides for accurately locating the fuel elements 28 and for laterally supporting and stabilizing the same, securingly or, as preferred, resiliently, against vibrational to other lateral movement. Thus, here the spring members 56 or 60 or 62 or 65 or 69 or 73 resiliently preclude any significant net movement of the fuel elements 28 laterally of their respectively defined positions. However, since only frictional restraint exists against unitary or differential longitudinal or axial movement of the fuel elements 28, such movement of the fuel elements 28 relative to the grid or grids is enabled by the described resilient fuel element engagement.

In addition to functioning to engage the fuel elements 28, the grid should not significantly impede the flow of coolant through the frame 30 and along the fuel elements 28. In connection with the latter consideration, the species of the grid depicted in FIG. 3 or 6 or 9 or 17 is particularly suited for this purpose as related in the aforementioned copending application.

To this point in the description, only general reference has been made to the fuel elements 28 and a more specific description of the same is now in order. Of course, the principal purpose of the fuel elements 28 is to dispose for heat exchange, as determined through design considerations, a quantity of fissionable material throughout the fuel arrangement 20 and, therefore, ultimately through the reactive region of the aforementioned core. In this instance, each of the fuel elements 28 is provided with an elongated cylindrical tube 82 (FIG. 1) which is formed from a cladding material, such as stainless steel, selected generally in accordance with the considerations previously set forth in connection with the selection of structural materials for the fuel arrangement 20. The elongated tube 82 is formed to receive a plurality of diametrically conforming, cylindrical pellets (not shown) of fissionable material. End plugs 84 and 86 are sealed hermetically to the open ends of the cylindrical tube 82 thereby to complete the fuel element 28 and to retain the inserted fuel pellets.

The end plugs 84 and 86 are tapered, as indicated by the reference character 88, to terminate, respectively, with relatively slender extensions 90 and 92. Thus, the entry or exit of coolant through the frame end plates 36 and 38 is minimally obstructed by the fuel element plugs 84 and 86 and is enabled to be distributed as uniformly as practically feasible into fluid channels 93 between adjacent fuel elements 28. The end plugs 84 and 86 can, if desired, be employed for engaging the fuel elements 28 with the frame 30.

In the embodiment of the invention illustrated in FIG. 1, the fuel arrangement 20 is also provided, as previously noted, with the upper and lower retaining plates 32 and 34. The latter generally conform in size and shape to the upper and lower end plates 36 and 38 of the frame 30. To facilitate positioning of the fuel arrangement 20 within the aforementioned core, a beveled peripheral portion 94 is provided on the retaining plates 32 and 34. The retaining plates 32 and 34 are also provided with coolant passages 96 and, if desired, means or recesses or channels 98 for engaging the fuel element end plug 86.

The end plugs 86, being observably longer than the end plugs 84, extend through colant passages 48 of the end plates 36 and 38, here for engagement with the retaining plate 32 or 34 in the channels 98. As viewed in FIG. 1, the coolant passages 96 in the retaining plates 32 and 34 are laterally offset from the coolant passages 48 in the end plates 36 and 38. Thus, to obtain uniform flow it is particularly desirable that the retaining plates 32 and 34 be spaced from the end plates 36 and 38, respectively. Spacers 100 and 102 are provided for this purpose.

Similarly, the end nozzles 22 are positioned in spaced relation to the retaining plates 32 and 34 through the use of spacers 106 for the purpose of obtaining uniform fluid flow. To secure the end nozzles 22 and the retaining plates 32 and 34 with the frame 30 bolts 108 and 110 are provided.

In connection with assembling the exemplified fuel arrangement 20, the frame 30 can first be formed in the manner previously described; and it is only necessary then that the fuel elements 28 be guided through the frame plate passages 48, through aligned passages 57 or 78 in one or more of the aforedescribed grid structures so that the end plugs 84 are engaged with the adjacent end plate engaging means or channels 50. It is to be noted that to effect the preceding operation, the coolant passages 48 of the frame plate 36 or 38 are aligned, respectively, with the recesses 50 of the plate 38 or 36.

Relative to the exemplified engagement of the fuel elements 28 with the plates 36 and 38, it is to be noted as being a sliding one in which lateral motion of the fuel elements 28 is substantially precluded and in which longitudinal motion of the same is enabled at least a limited extent. Thus, each of the fuel element extensions 90 is provided with beveled portion 112 for limiting movement of the fuel elements 28 against the end plate 36 or 38, and an end portion 114 for sliding movement in the end plate channels 50. Each end portion 114 is provided with a nose 116 facilitating entry of the fuel elements 28 into the end plate channels 50; and as a corollary, each plate channel 50 is enlarged with the use of a beveled portion 118 for the same purpose and, in addition, for engaging the fuel element beveled portion 112 in limiting the insertional or longitudinal or axial movement of the fuel elements 28. If desired, the noses 116 can be split longitudinally (not shown) to provide resilient forces for ensuring the preclusion of vibratory motion of the ends of the fuel element 28.

If the frame 30 is formed before the fuel elements 28 are engaged therewith, the fuel elements 28 are inserted alternately through the end plates 36 and 38 so that, when fully inserted and engaged by the end plate channels 50, the fuel element plug extensions 92 are free so as to project through the aligned end plate passages 48. The procedure just noted in preferably employed for the embodiment of FIG. 1, but if the engagement of the fuel elements 28 with the frame plates 36 and 38 is to be secured or bonded one rather than a slidable one, it may be desirable to assemble the fuel elements 28 with the frame plates 36 and 38 prior to the final forming of the frame 30.

The end plug extensions 92 are also provided with a beveled portion 112 and a projection 114 having a nose 116 for purposes already considered. When partially assembled as thus far described, the fuel arrangement 20 includes the frame 30 and the array of positioned fuel elements 28, with alternate fuel elements 28 having their end plugs 86 projecting through the frame end plates 36 and 38, respectively.

To continue with the assembly description, the retaining plates 32 and 34 are positioned over the projecting end plugs 86 such that the plug projections 114 are guided into the retaining plate engaging means or channels 98. Of course, the spacers 100 and 102 are appropriately positioned between the end plates 36 and 38 and the retaining plates 32 and 34, respectively. To index the spacers 100 against lateral movement relative to the end plates 36 and 38 and the retaining plates 32 and 34, detents 120 are provided in the end and retaining plates 32, 34, 36 and 38 for receiving the spacers 100. A detent 122 is also provided in the retaining plates 32 and 34 for laterally indexing the spacers 102. To secure the spacer 102 to the end plates 36 or 38, a threading engagement, as indicated by the reference character 128, can be employed.

The reason for the structural differences between the spacers 100 and 102 is founded on the fact that the spacer 100 is superposed over what would normally be a channel 50 in the end plate 36 or 38. On the other hand, the spacer 102 is superposed over what would normally be a flow pasage 48 in the end plate 36 or 38 and is provided with a centrally located recess 124 having a beveled portion 126 to provide means for engaging the adjacent fuel element end plug 84 in a manner similar to that provided through the use of the channels 50 in the end plates 36 and 38. In connection with the latter consideration, it is to be noted that each fuel element 28′ which is located adjacently to the spacers 106 is provided with a pair of end plugs 84 rather than one end plug 84 and one end plug 86 so as to provide for accommodating the spacer 100 at one end of fuel element 28′ and the spacer 102 at the opposite end thereof. Specifically, fuel element 28′ extends only between end plates 36 and 38. Therefore, the shorter end plug 84 must be used at each end of the fuel element.

A channel 130 is provided through the retaining plates 32 and 34, to be aligned with each of the spacers 100 or 102, for the purpose of allowing passage of the securing bolts 108 and 110. The annular spacers 106 are placed adjacently to the retaining plate openings 130; and the end nozzle 22 are, in turn, placed upon the spacers 106.

It connection with the latter step, it is to be noted that the end nozzles 22 are provided with mounting lugs 132 having passages 134 for the bolts 108 and 110. The passages 134 have an enlarged portion 136 in order to provide for supporting an annularly shaped retainer or bushing 138. To secure the fuel arrangement 20 in assembled form, the bolts 108 and 110 are inserted through the nozzle lugs 132 and the retaining plates 32 and 34 for securance with the frame end plates 36 and 38.

Thus, the bolts 108 and 110 are inserted through the bushings 136 and the nozzle mounting lugs 132, through the spacers 106 and through the retaining plate passages 130 into the spacers 100 or 102. Each bolt 108 is then threadedly engaged with the end plate 36 or 38, and, being provided with a recess 139 which is enlarged with a beveled portion 140, serves to engage the end projection 114 of the adjacent fuel element 28. Of course, what would ordinarily be a channel 50 in the end plate 36 or 38 is necessarily enlarged to provide the related threaded engagement of the bolts 108 with the end plate 36 or 38. The bolts 110 are threadedly engaged with the spacers 102, which are threadedly secured to the end plates 36 and 38, and for this purpose a recess 142 with peripheral threading is provided in the spacers 102. When the frame 30 and the retaining plates 32 and 34 and the end nozzles 22 are fully secured together by a tightening of the bolts 108 and 110, staking portions 144 of the bushings 138 can be deformed to overlie bolt portions 146, beveled if desired, so as to retain the bolts 108 and 110 in their tightened position.

Clearly, the final form of the fuel arrangement 20 is one characterized with considerable rigidity against thermal, fluid, mechanical and other environmental forces. Nevertheless, the fuel elements 28 can be differentially altered in longitudinal dimension substantially without deforming or bowing the arrangement 20. Thus, the means for supporting the fuel elements 28 are functionally related to the same so as to enable the preceding result to be obtained. More specifically, in the exemplified embodiment, the end plug projections 114 are relatively free to move longitudinally of the arrangement 20 inwardly or outwardly of the channels 50 or 98 or 124 or 139. Moreover, as has already been set forth, lateral supporting means or the aforedescribed grid or grids can be arranged so that the fuel elements 28 are stabilized against lateral motion through the use of resilient engaging forces but relatively free to move longitudinally of the grid or grids. It is also noteworthy that the fuel elements 28, being individually insertable in the arrangement 20, also are individually removable so as to facilitate replacement or inspection of the same. From the foregoing it is clear that the form embodied here for the means for supporting the fuel elements 28 precludes intolerable bowing or deformation of the arrangement 20.

For notation purposes, whether any bowing of a fuel arrangement of conventional construction is significantly objectionable is, in part, dependent upon the length of the included fuel element. Thus, for example, since the differential length of a member resulting from thermally induced expansion or contraction is substantially proportional to the square of the reference length of the member, the longer the fuel element, the greater the significance that any resulting bowing or deformation of the arrangement 20. For example, it has been found that when fuel elements of a length such as five feet are employed, bowing can become so objectionable as to necessitate some means for precluding it. It is also to be noted that because each end of the fuel elements 28 is limited in its movement outwardly of the arrangement 20, escape of any of the elements 28 from the arrangement 20 into the fluid flow path or circulatory system is most unlikely. In addition, since the fuel elements 28 are located within the outer periphery of the frame 30, interference by the fuel elements 28 with control rod movement is substantially precluded.

In FIGS. 12, 13, 14 and 23 another embodiment of the invention is illustrated, including an alternate form for the means for supporting fuel elements so as to provide a fuel arrangement that is generally free from being deformed or bowed. Thus, a fuel arrangement or assembly 220 comprises end nozzles or mounting members 222 for support in the aforementioned core and a frame 230 having vertical structural members of struts 240 and an upper end plate 236 and a lower end plate 238.

Fuel elements 228 are disposed within the frame 230 for purposes already fully considered. A grid 235 or a plurality of grids 235, of any of the forms already considered, is also included with the frame 230 for the purpose of laterally supporting the fuel elements 228. For example, as better shown in FIG. 23 the grid arrangement described heretofore in connection with FIG. 10 can be utilized. However, in describing the salient features of the invention, as depicted in FIGS. 12, 13, 14, and 23, it is to be understood that other lateral joining means can be utilized provided that the requisite amount of relative longitudinal expansion is afforded by such means. Evidence of this utilization, together with the unique cooperative characteristics exhibited by the lateral joining means in conjunction with the modificational illustration of FIGS. 12, 13, 14, and 23 will be set forth subsequently.

Figure 12:
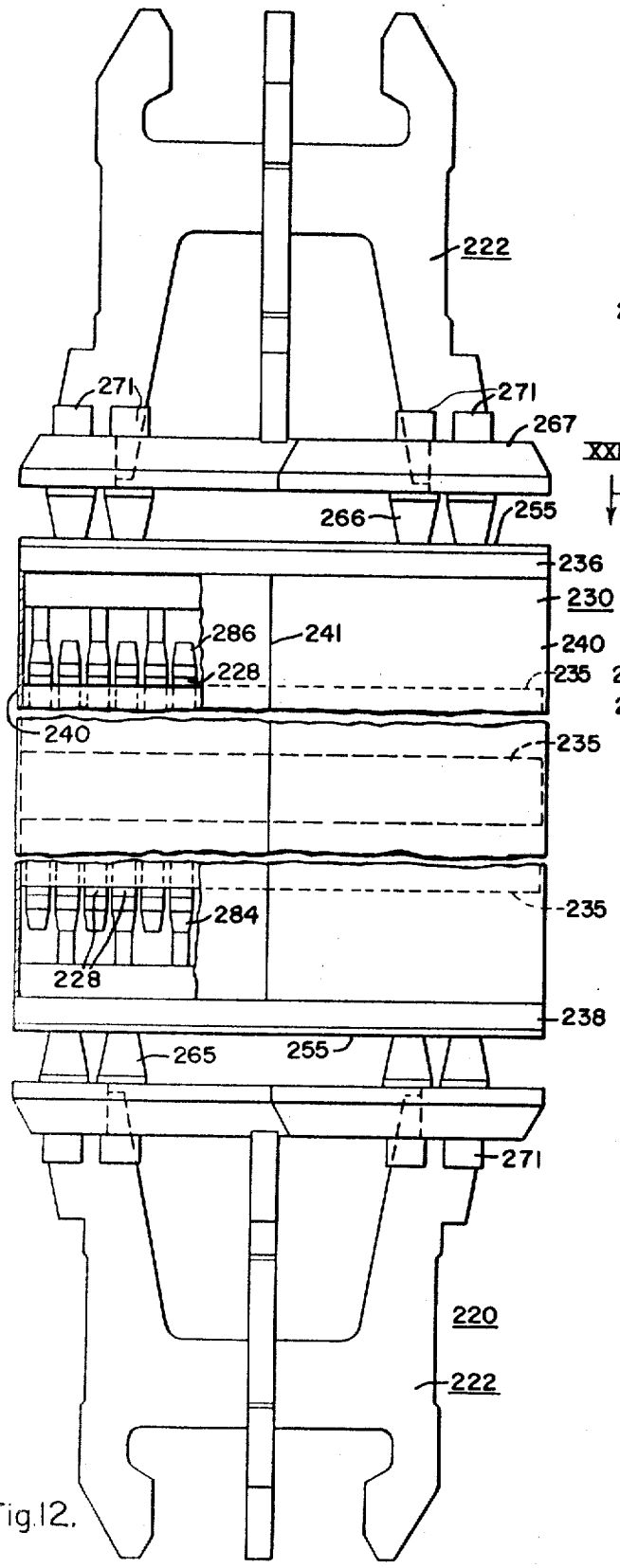
FIG. 12 is a front elevational view, with portions being in section and other portions being removed for clarity, of another fuel element arrangement constructed in accordance with the principles of the invention.

As illustrated in FIG. 12, the struts 240 can be constructed from an imperforate sheet material so as to close the vertical sides of the frame 230. If desired, the resulting seam, as indicated by the reference character 241, can be sealed, as by welding, in order to preclude fluid from being emitted laterally from the frame 230. Alternatively in other applicative modifications, openings or perforations (not shown) can be provided in the struts 240 for the purposes of inducing a lateral component of fluid flow to or from the frame 230 and of resultantly inducing cross-mixing coolant flows among adjacent fuel assemblies, when a plurality of such assemblies are supported operatively in a known reactor core structure (not shown).

Figure 14:
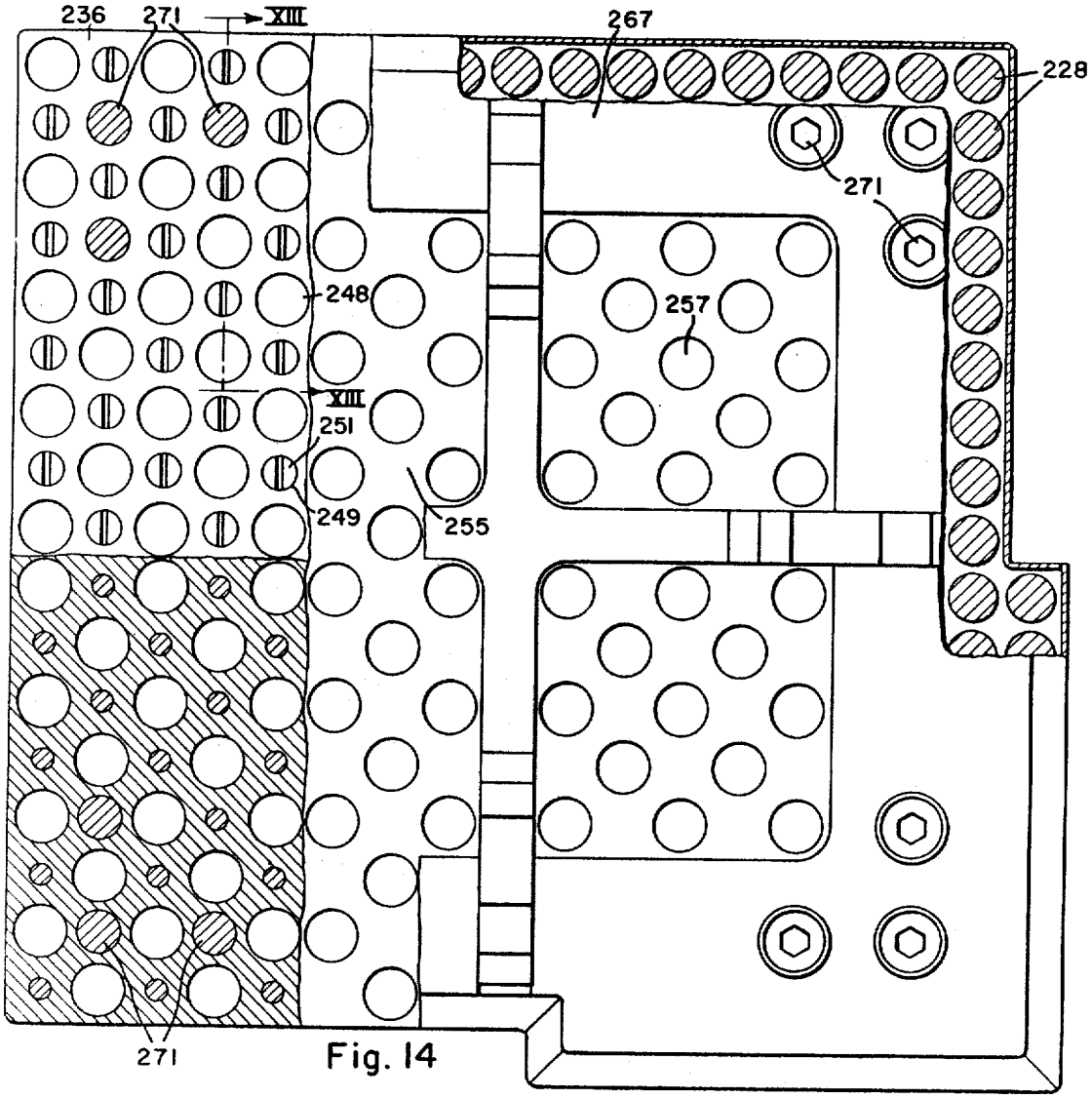
FIG. 14 is an enlarged top plan view of the fuel element arrangement of FIG. 12, with portions being broken away for clarity.

With reference specifically to FIG. 14, a plurality of passages 248 are provided in the frame end plates 236 and 238 for fluid flow purposes. In addition, a plurality of recesses or channels 249 for receiving fuel element retaining bolts 251 or other fastening members are provided. A relatively thin retaining plate 255 is employed to retain the bolts 251 in the completed fuel arrangement 220. The retaining plates 255 are provided with fluid flow openings 257 in alignment, respectively, with the end plate flow openings 248.

The fuel elements 228 are provided in this arrangement with hermetically sealed end plugs 284 and 286 with the end plugs 284 having an extension 261 provided with a threaded recess 253 for engagement with the bolts 251. To facilitate insertion of the fuel elements 228 in the frame 230, the end plugs 284 and 286 are tapered as indicated by the reference character 263. As can readily be observed, the bolt channels 249 in each end plate 236 or 238 are aligned with the flow channels 248 in the other end plate 238 or 236, and hence with the fuel elements 228 respectively when mounted as shown more particularly in FIG. 13. Thus, to assemble the fuel elements 228 with the frame 230, the fuel elements 228 can be inserted alternately through the flow passages 248 of the end plates 236 and 238 for engagement with an opposing bolt 251, resulting in a secured engagement of some of the fuel elements 228 at one end plate 236 with the remainder of the fuel elements at the other end plate 238, as distinguished from the sliding engagement of the fuel elements 28 with the end plates 32, 34, 36, 38 described in connection with FIG. 1.

When the fuel elements 228 are so assembled the free ends of those fuel elements rigidly secured to the end plate 236 are respectively aligned with the flow apertures 248 of the other end plate 238, while the free ends of those fuel elements rigidly joined to the latter end plate 238 are respectively aligned with the flow apertures 248 of the former end plate 236. With this arrangement, where only one end of each fuel element is engaged with an associated end plate 236 or 238, only a minimal impedance to coolant flow through the flow channels 248 of the end plates is introduced.

Moreover, the securance of only one end of the fuel elements 228 permits the fuel elements of each group thereof respectively secured to the end plates 236 or 238 to elongate longitudinally in the same direction, relative to other fuel elements in the same group, and in the opposite direction relative to the fuel elements in the other groups, under impetus of thermal expansion. With the aforedescribed counter-current elongations, as it were, the central transverse axis of the fuel material is not shifted relative to the central transverse axis of the overall fuel assembly and hence of the overall fuel assembly and hence of the reactor core structure (not shown) when a group of these fuel assemblies are assembled operatively into such core structure. Thus, the physical and nuclear characteristics of a reactor, when provided with the latter mentioned fuel assemblies, can be more accurately calculated or predicted in certain applications, at least.

When the aforementioned groups of fuel elements 228 are thus assembled, a grid arrangement such as that denoted generally by the reference character 235, is mounted adjacent each group of free fuel element ends in order to stabilize the otherwise laterally unsupported free ends. This grid arrangement can be applied in one of a variety of forms but desirably engages each fuel element 228 resiliently and frictionally to preserve the predetermined lateral distribtuion of the fuel elements and at the same time to allow relative longitudinal movement of the associated free end portions of the fuel elements, for the purpose of allowing differential thermal elongation to occur without otherwise resultant bowing of the fuel assembly 220 and/or fuel elements 228. Desirably also, the component parts of the grid arrangement are made relatively thin so as to introduce only a minimum of impedance to the flow of reactor coolant longitudinally through the fuel assembly 220. Thus, any of the lateral joining grids herein can be employed to advantage. An example of such employment is illustrated more particularly in FIG. 23 of the drawings. The grid arrangement of FIG. 23 has previously been described in detail in connection with FIGS. 9–11 of the drawings. FIG. 23 also shows the distribution of the connected and free ends of the fuel elements 228 at either end of the fuel assembly 220.

As noted more specifically in FIG. 12 of the drawings, one or more additional grid arrangements 235 can be spaced along the length of the fuel assembly to laterally stabilize those portions of the fuel elements 228 which are intermediate the aforementioned end grid arrangements.

When the fuel elements 228 are assembled with the frame 230 as described, the retaining plate 255 is positioned over the frame end plates 236 and 238; and, in turn spacers 265 are positioned upon the retaining plates 255 for supporting the end nozzles 222 in spaced relation from the frame 230. The end nozzles 222 are provided with mounting lugs or annular mounting plates 267 having passages 269 through which bolts 271 or 271' can be passed for mounting the end nozzles 222 relative to the frame 230 and for securing the arrangement 220 in assembled relation. Specifically, each spacer 265 bears against both the retaining plate 255 and the mounting member 267 as viewed in FIG. 13. If desired, a bushing 273 can be provided with staking portions 275 for locking the bolts 271 and 271' in position when fully tightened. The ends of the bolts 271 are threaded, as indicated by the reference character 277, to be received in aligned threaded recesses 279 in the end plates 126 and 238.

In the instance, in which a nozzle bolt 271' overlies an end plate bolt channel 139', as can be observed in the lower portion of FIG. 13, the end plate channel 249' is considerably shortened and enlarges into the adjacent opening 279'. As a consequence, a shorter bolt 252 is then employed for engaging and retaining the adjacent fuel element 228'.

When the bolts 271 and 271' are fully tightened and locked, the spacers 265 are held against the retaining plates 255 which, in turn, are held against the frame 230, more specifically the outer surfaces of the end plates 236 and 238 respectively. Thus, as the fuel element supporting means is embodied here, the completed fuel arrangement or assembly 220, like the fuel arrangement 20 of FIG. 1, is a relatively rigid one that substantially cannot be subjected to deformation or bowing as a result of thermal, fluid, mechanical or other environmental forces or stresses. In particular, it is to be noted that the fuel element ends having the end plugs 286 are relatively free to effect required differential longitudinal expansion or contraction of the fuel elements 228. The fuel elements 228, like the fuel elements 28 of FIG. 1, also are individually removable from the arrangement 220 for inspection or replacement.

In a preceding portion of this description, it was related that the supporting means for the fuel elements 28 (or 228) need include means for laterally holding the fuel element ends only if desired. Thus, alternatively, plates 336, as viewed in FIG. 21, can be employed to form the ends of the frame 30 of FIG. 1 or the frame 230 of FIG. 12.

The plates 336 include a grid network 337 which forms a plurality of fluid flow passages 348 and a plurality of intersecting portions 339 serving as abutments to limit longitudinal movement of the employed fuel elements and to retain the same within the employed frame. Of course, if the plates 336 are employed with the frame 30, appropriate structural modifications in the arrangement 20, particularly removal of the retaining plates 32 and 34, would logically be made.

FIG. 22 is presented to illustrate the relation between the fuel elements 28 and one of the plates 336 when employed with the frame 30 of FIG. 1. As shown, the ends of the fuel elements 28 are, in this instance, provided with relatively short end plugs 384. With the fuel elements 28 having resiliently lateral support from a plurality of the aforedescribed grid structures, and with the fuel elements 28 being slightly shorter than the distance between the opposing plates 336, differential or unitary longitudinal movement of the fuel elements 28 is clearly enabled. Thus, the equilibrium position of the fuel elements 28, shown here to be against the one plate 336, is the result of resolving all the forces applied thereto, with the movement being limited in extent by the plate intersecting portions 339. Of course, the fuel elements 28 are, in this example, inserted within the frame 30 prior to final placement of at least one of the plates 336.

In the foregoing description, several arrangements or combinations of fuel element assemblies and their component parts have been fully illustrated and described to point out the principles of the invention. The description, however, is intended only for the purpose of clearly illustrating and exemplifying these principles of the invention; and, accordingly, it is desired that the invention be not limited by the arrangements or embodiments described here, but, rather, that it be accorded an interpretation consistent with the scope and spirit of its broad principles.

What is claimed as new is:

1. A fuel element arrangement for use in a nuclear reactor, said arrangement comprising a plurality of elongated fuel elements, an elongated frame member for supporting said elements generally in a lattice array, said frame member being substantially coextensive with said elements, first plate means mounted adjacent one end of said frame member and engaging the adjacent ends of some of said fuel elements, said first plate means having a plurality of flow apertures extending therethrough and disposed adjacent the nearer ends of the remainder of said fuel elements, and second plate means mounted adjacent the other end of said frame member and engaging the adjacent ends of said remainder fuel elements, said second plate means having a plurality of apertures formed therein and disposed adjacent the nearer ends of said some fuel elements.

2. The combination of claim 1 including lateral supporting means secured to said frame member and engaging said fuel elements resiliently and individually so as to preclude relative lateral movement thereamong.

3. The combination of claim 1 including at least one lateral supporting grid secured generally within said frame member and intermediately of the ends thereof, said grid having a plurality of apertured engagement means for engaging the adjacent portions of said fuel elements to preclude lateral movement amoung said fuel elements.

4. The combination of claim 1 wherein said flow apertures in said first and second plate means are substantially axially aligned with said reminder and said some fuel elements respectively, and are at least slightly oversize relative to the cross-sectional configuration of said fuel elements so that said fuel elements can be added and withdrawn relative to said fuel arrangement without removal of the associated plate means.

5. The combination of claim 1 including a pair of flow-conducting mounting members disposed at the ends respectively of said fuel arrangement, and means for spacedly securing each of said flow-conducting members to the outward side of one of said plate means to provide proper distribution of coolant passing through said mounting members to the apertures of the adjacent plate means.

6. The combination of claim 1 including a plurality of fastening members extending through said first and said second plate means and rigidly securing the engaged ends of said some and said remainder fuel elements respectively to said first and said second plate means respectively, and a pair of fastening member retaining plates overlying and secured to the outer surfaces of said first and said second plate means respectively, said retaining plates each having a plurality of flow apertures corresponding in configuration and in alignment with the flow apertures of the adjacent plate means.

7. The combination of claim 6 including a pair of flow-conducting mounting members disposed respectively at the ends of said fuel arrangement, additional fastening members passing through apertures therefor in said retaining plates respectively and securing said mounting members in outwardly spaced relation to said first and said second plate means respectively, and a spacing member on each of said additional fastening members positioned between the adjacent mounting members and retaining plates respectively, said spacing members each being held in bearing engagement with said adjacent mounting member and retaining plate whereby said mounting members are retained in said spaced relation and said retaining plates are securely held against said first and said second plate means respectively.

8. The combination of claim 1 wherein said first plate means and said second plate means are spaced outwardly from the nearer ends of said remainder fuel elements and from the nearer ends of said some fuel elements respectively.

9. The combination of claim 1 including a first support means secured to said frame member and positioned longitudinally outwardly of said first plate means, said remainder fuel elements passing through said flow apertures in said first plate means and engaging said first support means, and a second support means secured to said frame member and positioned longitudinally outwardly of said second plate means, said some fuel elements passing through said flow apertures of said second plate means and engaging said second support means.

10. The combination of claim 9 wherein said apertures in said first plate means and said second plate means are substantially longitudinally aligned with said fuel elements and are slightly oversized relative to the cross-sectional shape and area of said fuel elements so that said remainder fuel elements and said some fuel elements can be added and withdrawn relative to said engagement by removing said first support means for said remainder fuel elements and said second support means for said some fuel elements.

11. The combination of claim 9 including a longitudinally outwardly extending detent positioned adjacent each end of each fuel elements said detents being slidably received respectively in complementary indents formed in said plate means and said support means, and a stop member disposed on each of said fuel elements adjacent each detent and positioned to afford limited longitudinal movement of said fuel elements relative to said plate means and said support means.

12. The combination of claim 9 wherein each of said support means includes a plurality of flow apertures therein which are laterally offset relative to said flow apertures in said plate means to afford flow distribution thereto, and wherein a pair of flow-conducting mounting members are disposed respectively at the ends of said fuel arrangement and having means for securing said mounting members at positions respectively spaced outwardly and longitudinally from said support means to afford flow distribution from said mounting members to said apertures in said support means.

13. The combination of claim 9 including a plurality of first fasteners securing said first support means in spaced relation with said first plate means at one end of said fuel arrangement, a plurality of second fasteners securing said second support means in spaced relation with said second plate means at the other end of said fuel arrangement, said first and second fasteners extending through at least the adjacent plate means and being in respective alignment, and a number of additional fuel elements extending between said first and second plate means in alignment with said first and second fasteners, said additional fuel elements having their ends engaging said first and second fasteners.

14. The combination of claim 9 including lateral supporting means secured to said frame member and engaging said fuel elements individually and resiliently intermediate the ends thereof so as to preclude relative lateral movement thereamong.

15. The combination of claim 9 wherein the end portion of each fuel element is necked down at least in the immediate vicinity of said apertures in said first and second plate means to afford a greater flow area therethrough.

16. A fuel arrangement for a nuclear reactor comprising a plurality of elongated fuel elements disposed in a generally parallel array, an elongated structural member coextending with at least a portion of said fuel elements, at least one grid member secured to and extending laterally from said structural member and having openings through which said fuel elements extend, said grid member having resilient means extending into at least some of said openings and resiliently engaging those fuel elements extending through said some openings respectively to position the last-mentioned fuel elements against lateral displacement.

17. The combination of claim 16 wherein said grid member comprises a plurality of rigidly interengaged straps, said straps forming said openings longitudinally parallel to said fuel elements, and wherein said resilient means are formed integrally on said straps and extend laterally into said some openings.

18. The combination of claim 17 wherein said straps are cross-laced, and said resilient means comprises a plurality of cantilever spring tabs extending outwardly from each of the longitudinal edges of said straps and into each adjacent opening in said grid member to resiliently engage said fuel elements.

19. The combinations of claim 17 including a second grid member, and wherein said one grid member is disposed transversely of said structural member and said second grid member is disposed transversely of said structural member and spaced longitudinally from said one grid member, said one and said second grid members each having cross-laced straps and defining a lattice of openings in longitudinal alignment with one another, and wherein said fuel elements extend longitudinally through the aligned openings of said one of said second grid members, each of said grid members having a plurality of cantilever spring tabs extending outwardly from at least one longitudinal edge of each of said straps into adjacent openings in said grid member whereby said tabs of said one grid member resiliently engage some of said fuel elements and said tabs of said second grid member resiliently engage the remainder of said fuel elements.

20. The combination of claim 16 including a pair of perforated end plates positioned adjacent the ends of said fuel elements, means securing said end plates to said elongated structural member, one of said end plates longitudinally supporting said fuel elements at one end thereof, and the other of said end plates spaced longitudinally outwardly of the other ends of said fuel elements for retaining said fuel elements between said end plates yet enabling at least limited longitudinal movement of said fuel elements toward and away from said other end plate.

21. The combination of claim [1] *16,* wherein each of said fuel elements are tubularly shaped and wherein each of said resilient means are arcuately shaped projections with a generally opposed curvature relative to that of said fuel elements.

22. A grid structure for a nuclear reactor fuel subassembly containing a plurality of elongated fuel elements disposed in the fuel subassembly in a generally parallel array, said grid structure comprising a plurality of *rigidly joined* connecting members forming respective openings through which said fuel elements are adapted to extend, a plurality of projections extending into said openings from said connecting members and engaging said fuel elements respectively to position said fuel elements against lateral displacement, said projections being resilient to resiliently engage said fuel elements *and having a limited force of contact with said fuel elements to permit longitudinal movement of said fuel elements relative to said projections,* said connecting members being formed from interlaced straps of substantially smaller width to length ratio, and said openings extending parallel to the widths of the straps.

23. The combination of claim 22, wherein said connecting members are cross-laced rigidly interengaged straps and said projections extend into an opening by groups of four, said four projections being laterally displaced approximately 90° from one another and at approximately the same longitudinal level.

24. The combination of claim 22 wherein said straps are rigidly interlaced approximately perpendicular to one another, and said resilient projections extend into an adjacent opening by groups of four projections.

25. The combination of claim 22 wherein each of said straps has a plurality of cantilever spring tabs extending outwardly from at least one edge of said strap, each of said tabs projecting into an adjacent one of said openings.

26. The combination of claim 25 wherein each of said straps has a plurality of cantilever spring tabs extending outwardly from each of its longitudinal edges and has one spring tab projecting into each adjacent opening.

27. The combination of claim 25 wherein one spring tab extending into one opening is disposed laterally opposite to another spring tab extending into said one opening.

*28. A fuel assembly for nuclear reactor comprising a plurality of elongated fuel elements disposed in a generally parallel array, a plurality of rigid grid members each formed by a plurality of rigidly connected pieces, said* [*rigid*] *pieces of each grid member being disposed to define openings through which said fuel elements extend,* [*said*] *respective openings of* [*each*] *said grid* [*members*] *being* [*longitudinally aligned to accommodate passage of respectively full elements therethrough*] *an elongated rigid structural member coextending with at least a portion of said fuel elements and fixedly secured to each of said grid members, said grid members extending laterally from said structural member, and said grid members having resilient means extending into said openings and resiliently engaging said fuel elements to position said fuel elements against lateral displacement yet permitting individual longitudinal movement of said fuel elements relative to said resilient means.*

*29. The fuel assembly of claim 28 including a pair of perforated end plates positioned adjacent the ends of said fuel elements and extending laterally thereacross, said end plates being fixedly secured to said structural member and positioned to retain said fuel elements therebetween yet enable at least limited longitudinal movement of said fuel elements.*

*30. The fuel assembly of claim 28 wherein said resilient means are formed integrally with and extend from said pieces forming said grid members.*

*31. The fuel assembly of claim 28 wherein each of said grid member openings has one of said fuel elements extending therethrough.*

*32. The fuel assembly of claim 28 wherein at least one resilient means resiliently engages each of said fuel elements adjacent each of said grid members.*

*33. The fuel assembly of claim 31 wherein at least one resilient means resiliently engages each of said fuel elements adjacent each of said grid member openings.*

*34. The fuel assembly of claim 28 wherein said rigid grid members are formed by cross-laced interengaged straps and wherein the material content of said straps is minimized to minimize parasitic neutron absorption by said straps.*

*35. The fuel assembly of claim 34 wherein each of said resilient means is formed integrally on said* [*straps*]*.*

*36. The fuel assembly of claim 28 wherein at least one of said resilient means extends from an edge of one of said grid members.*

*37. The fuel assembly of claim 30 wherein each of said resilient means comprises a cantilever spring tab.*

*38. A fuel assembly for nuclear reactor comprising a plurality of elongated fuel elements disposed in a generally parallel array, a plurality of grid members defining a plurality of rigid sided openings through which said fuel elements extend, said grid members being formed such that the material content thereof is minimized to minimize parasitic neutron absorption, respective openings of said grid members being longitudinally aligned to accommodate passage of respectively fuel elements therethrough, an elongated rigid structural member coextending with at least a portion of said fuel elements and fixedly secured to each of said grid members, said grid members extending laterally from said structural member and said grid members having resilient means extending into said openings and resiliently engaging said fuel elements to against lateral displacement position said fuel elements yet permitting individual longitudinal movement of said fuel elements relative to said resilient means.*

*39. The fuel assembly of claim 38 including a pair of perforated end plates positioned adjacent the ends of said fuel elements and extending laterally thereacross, said end plates being fixedly secured to said structural member and positioned to retain said fuel elements therebetween yet enable at least limited longitudinal movement of said fuel elements.*

*40. A fuel assembly for a nuclear reactor comprising a plurality of longitudinally movable, elongated fuel elements disposed in a generally parallel array, said fuel elements being coextensive in length, means for supporting said fuel elements for limited movement to permit longitudinal expansion and contraction of each fuel element independently of longitudinal expansion and contraction of the other longitudinally movable fuel elements, an elongated rigid structural member coextending with at least a portion of said fuel elements, a plurality of grid members spaced apart longitudinally along said array and each rigidly secured to and extending laterally from said structural member, each of said grid members comprising peripheral straps and two sets of intersecting and rigidly interconnected inner straps with said inner straps of one set extending transversely of said inner straps of the other set and said straps cooperating to form a plu-*

*rality of openings, respective openings in said grid members being aligned longitudinally of said array to form groups of aligned fuel element openings accommodating the longitudinally movable fuel elements passing therethrough, there being a group of longitudinally aligned fuel element openings for each longitudinally movable fuel element, each of said inner straps having resilient springs formed integrally therewith and spaced apart therealong, at least one such spring extending into each of said fuel element openings in each grid member, said springs resiliently engaging the respective longitudinally movable fuel elements passing through the associated fuel element openings, thereby to position said fuel elements against lateral displacement while permitting longitudinal expansion and contraction of each such fuel element individually with respect to said grid members.*

*41. The fuel assembly of claim 40 wherein each said spring comprises a cantilever spring tab formed by bending a portion of one of said inner straps, said tabs being spaced apart along each of said inner straps and extending from opposite sides of each strap into the adjacent fuel element openings.*

*42. The fuel assembly of claim 40 wherein at least two springs extend into at least a majority of said openings from two inner straps extending transversely of each other and forming two side walls of each of the latter openings.*

*43. The fuel assembly of claim 40 wherein the material content of said inner and peripheral straps is minimized to minimize parasitic neutron absorption.*

*44. The grid structure of claim 22 wherein a plurality of said projections extend into each of said openings to resiliently engage the respective fuel element passing therethrough at points spaced peripherally about the fuel element.*

References Cited

The following references, cited by the Examiner, are of record in the patented file of this patent or the original patent.

UNITED STATES PATENTS

| | | | |
|---|---|---|---|
| 2,898,280 | 8/1959 | Schultz | 176—78 |
| 3,011,962 | 12/1961 | Koch et al. | 176—78 X |
| 3,068,163 | 12/1962 | Currier et al. | 176—78 |
| 3,070,534 | 12/1962 | Kooistra | 176—78 |
| 3,103,477 | 9/1963 | Mong | 176—78 X |
| 3,104,218 | 9/1963 | Speidel et al. | 176—78 |
| 3,105,026 | 9/1963 | Dickson | 176—78 X |
| 3,142,627 | 7/1964 | Emerson | 176—78 |

FOREIGN PATENTS

| | | |
|---|---|---|
| 1,060,507 | 7/1959 | Germany. |
| 822,790 | 10/1959 | Great Britain. |

OTHER REFERENCES

P/2053 of Russian Report presented at the 1958 U.N. Geneva Conference, pp. 370–378.

P/2196 of Russian Report presented at the 1958 U.N. Geneva Conference, pp. 645–654.

REUBEN EPSTEIN, Primary Examiner

UNITED STATES PATENT OFFICE
CERTIFICATE OF CORRECTION

Patent No. Re. 27,950 Dated March 26, 1974

Inventor(s) Erling Frisch

It is certified that error appears in the above-identified patent and that said Letters Patent are hereby corrected as shown below:

Col. 5 line 61, delete "structs" and substitute -- struts --.

Col. 7 line 5, delete "Heil-arc" and substitute -- Heli-arc --.

Col. 13 line 60, delete "126" and substitute -- 236 --.

Col. 13 line 62, delete "139'" and substitute -- 249' --.

Claim 28 line 1, after "for" insert -- a --.

Claim 28 line 5, delete "[rigid]".

Claim 28 line 7, delete "[said]"; same line delete "[each]"

Claim 28 line 8 delete "[members]" and substitute -- members--; same line after "being", delete "[".

Claim 28 line 9, delete "respectively full" and substitute -- respective fuel --; same line after "therethrough" delete "]".

Claim 35 line 2, delete "[straps]" and substitute -- straps --.

Claim 38 line 9, delete "respectively" and substitute -- respective --.

Claim 38 line 16, delete line 16 in its entirety and substitute -- position said fuel elements against lateral displacement --.

Signed and sealed this 29th day of October 1974.

(SEAL)
Attest:

McCOY M. GIBSON JR.
Attesting Officer

C. MARSHALL DANN
Commissioner of Patents